(No Model.)
J. H. JONES.
CORN PLANTER.
No. 376,823. Patented Jan. 24, 1888.
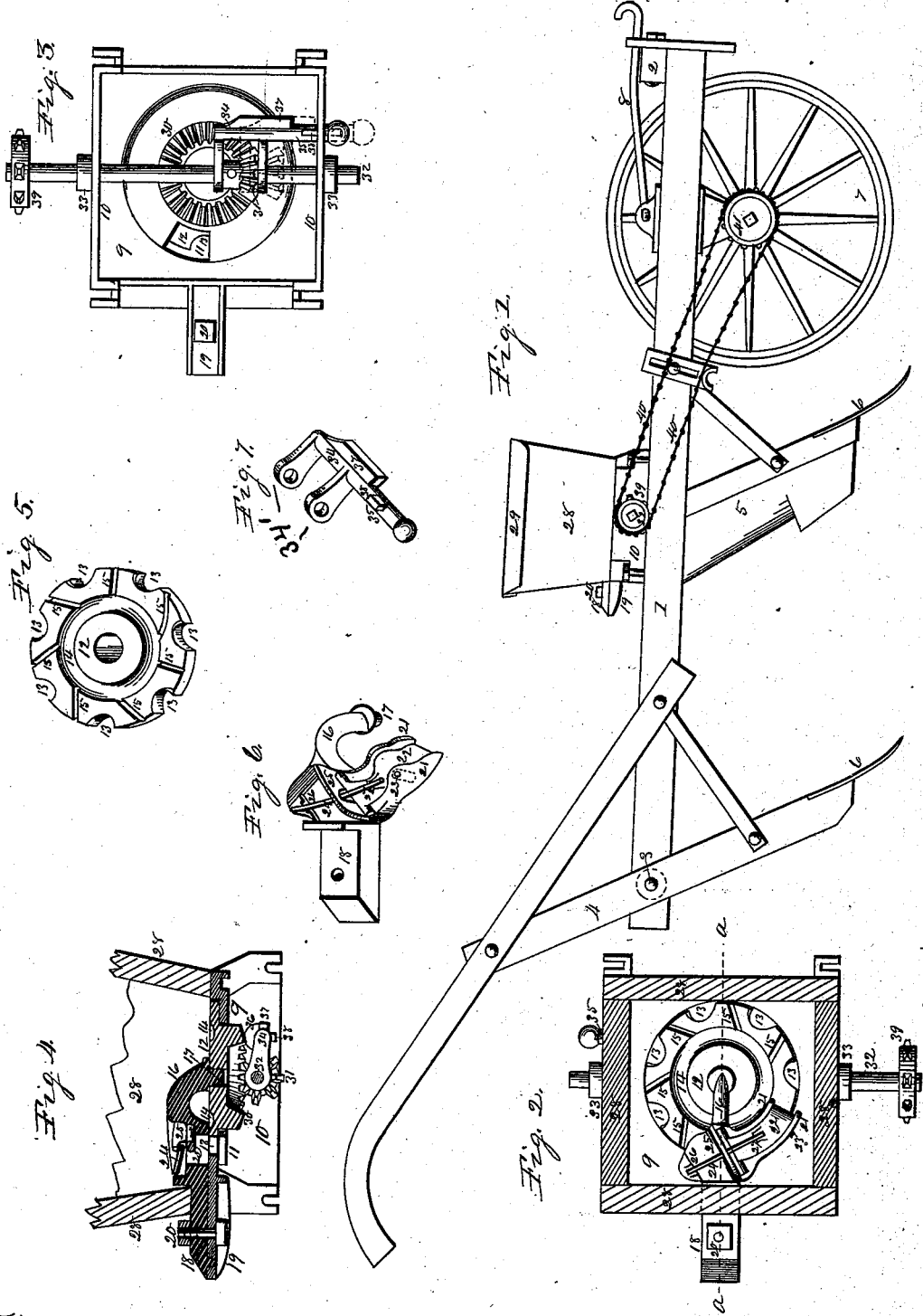
Witnesses
A. O. Behel
Evans Blake
Inventor
James Hiwa Jones
Per Jacob Behel
Atty.

UNITED STATES PATENT OFFICE.

JAMES HERVA JONES, OF ROCKFORD, ILLINOIS, ASSIGNOR TO EMERSON, TALCOTT & COMPANY, OF SAME PLACE.

CORN-PLANTER.

SPECIFICATION forming part of Letters Patent No. 376,823, dated January 24, 1888.

Application filed July 7, 1887. Serial No. 243,646. (No model.)

*To all whom it may concern:*

Be it known that I, JAMES HERVA JONES, a citizen of the United States, residing in the city of Rockford, county of Winnebago, and State of Illinois, have invented certain new and useful Improvements in Corn-Planters, of which the following is a specification.

This invention relates to a class of corn-planters known as the "seed-drill," by which the seed is deposited at intervals in rows. Its object is a uniform distribution of the seed at substantially equal intervals.

To this end I have designed and constructed the machine represented in the accompanying drawings, in which—

Figure 1 is a side elevation of a machine embodying my invention. Fig. 2 is a plan view of the bottom portion of the seed-box. Fig. 3 is an under face representation of the seed-box; Fig. 4, a lengthwise vertical central section on dotted line *a* on Fig. 2. Fig. 5 is an isometrical representation of the seed-distributing wheel. Fig. 6 is an isometrical representation of the spring-actuated cut-off, and Fig. 7 is an isometrical representation of the shipper.

The main frame of my improved planter consists of two like shovel-beams, 1, placed parallel in a horizontal plane, suitably separated and joined at their forward ends by a cross end bar, 2, securely fixed to the side beams, and a stretcher, the end of which is shown in dotted lines, is placed between the rear ends of the shovel-beams, and a bolt, 3, is passed through the shovel-standards 4, placed on the outside rear ends of the shovel-beams, through the shovel-beams, and lengthwise through the stretcher, and serves to fix the parts securely to each other. These several parts, including a seed-spout, 5, shovels 6, fixed to the lower ends of the rear shovel-standards and to the seed-spout, the driving-wheel 7, supported to revolve in bearings fixed to the under side of the forward ends of the shovel-beams, also the handles fixed to the shovel-beams and shovel-standards, and the draft-bar 8 and the vertical adjustment of its forward hook end, are substantially identical with like parts of a seeding-machine for which I have made application, and which is now pending before the United States Patent Office.

The bottom of the seed-box is made of an iron casting in stool form, consisting of a bottom plate, 9, with central opening to receive a seed-distributing wheel, and depending side edges, 10, forming foot-supports to the box to rest on the shovel-beams near the center of their length, to which the seed-box is fixed in place by screw-bolts in its slotted corner feet and extending through the shovel-beams. The edge wall of the center opening of the bottom is recessed on its upper face, and a seed-outlet opening, 11, is formed in the bottom portion of the recess and extends laterally outward through its annular wall.

A seed-distributing wheel, 12, of disk form, is made to enter the recessed opening in the bottom of the seed-box flush on its upper side with the upper face of the bottom. The seed-distributing wheel 12 is made with peripheral seed-cells 13, of scotia-curved form, as shown, and in connection with the annular wall of the recess in which it rotates forms seed-cells to receive the seed to be carried in its rotations and discharged through the outlet-opening 11.

A curved annular groove, 14, is formed in the upper face of the seed-distributing wheel immediately inside of the seed-cells to carry a quantity of seed, which in its centrifugal tendency in the rotary movement of the wheel will enter and fill the seed-cells with greater certainty.

Either radial, tangential, or curved grooves 15 are formed in the upper face of the seed-distributing wheel, to prevent the lodgment of grains under the free end of a cut-off to the seed-cells. The cut-off to the seed-cells consists of a rigid portion, a yielding portion, and a spring to the yielding portion. The rigid portion of the cut-off is of the peculiar form represented, in which the arm 16 is of the upward-curving form shown, and its free end is made with a depending stud-journal, 17, to enter axial opening in the seed-distributing wheel, on which it rotates in the recessed support. An arm, 18, of the rigid portion of the cut-off extends under the rear vertical wall of the seed-box, and is of a conformation to rest on the upper face of a rear arm-extension, 19, of the bottom plate, 9, of the seed-box, and a screw-bolt, 20, passed through the projecting arms 18 and 19, serves to fix the parts in place in a removable manner. Curved jaws 21 of the rigid portion of the cut-off extend on each side of the seed-cells, forming a channel directly over the seed-cells. A lever cut-off, 22, hinged at its heel end to the rigid portion of the cut-off, extends through the channel formed by the curved jaws 21, with its free end extending nearly to the free ends of the jaws. The free end portion of the lever cut-off 22 is provided with a horizontal transverse opening, (shown in end section in dotted lines in Fig. 6,) and a pin, 23, of less diameter than the opening in the lever cut-off, is passed transversely through the jaws 21 and through the opening in the lever cut-off and permits a limited vertical movement of the free end of the lever cut-off.

A spring, 24, consisting of a straight wire bar, is passed through an opening in a vertical wall, 25, immediately in rear of the hinge-connection of the lever cut-off with its rigid support, and one end of the spring rests in a seat, 26, in the rigid support, and its other end in a like seat, 27, in the lever cut-off, forward of its hinged connection with its rigid support. The action of the bar-spring tends to hold the free end of the lever cut-off in its lowest position, nearly in contact with the seed-plate, but in a manner to permit a limited vertical movement of its free end to prevent breaking or cutting the grains of the seed.

The vertical walls 28 of the seed-box are fixed at their lower ends to the outer edge portions of the metallic bottom, and a lid, 29, is employed to cover the box.

The seed-distributing wheel is provided on its under face with a toothed gear-wheel, 30. A gear toothed pinion, 31, is fixed on a shaft, 32, supported to revolve in bearings 33 in the foot-walls of the metallic bottom of the seed-box, and this shaft 32 is capable of an endwise movement in its bearings to place the gear-pinion in working contact with the gear-wheel on the under face of the seed-distributing wheel, as shown in Fig. 3, or to disengage it therefrom, as shown in dotted lines. A shifting-bar, 34, with ears 34', to receive the shaft 32, embraces the ends of the gear toothed pinion fixed thereon, and its shaft-like portion 35 extends parallel with the shaft outward through an enlarged opening, 36, formed in the foot-wall of the metallic base of the seed-box. The shifting-bar is provided on the forward side of its shaft-like portion with a projection, 37, to engage the inner face of the foot-wall of the metallic base to limit its outward movement, as shown in its dotted-line position in Fig. 3. The shifting-bar is also provided on its under face with a projection, 38, of such dimensions as to pass through the enlarged opening, and its position on the bar is such that its outer end will engage the inner face of the foot-wall, as shown in the solid lines in Fig. 3, to hold the gear-pinion 31 in working contact with the gear-wheel 30, and its length is such that when withdrawn to its dotted-line position shown to shift the pinion from gear-tooth connection with the gear-wheel, its inner end will engage the outer face of foot-wall of the metallic base, and, in connection with the projection 37, engaging the inner face of foot-wall of the metallic base, serves to hold the gear-pinion disengaged from the gear-wheel.

A sprocket-wheel, 39, is fixed to the projecting end portion of the pinion-shaft, and a chain belt, 40, connects it with a sprocket-wheel, 41, on the projecting end of the shaft of the driving-wheel, from which motion is imparted to the seed distributing wheel through the chain belt and its connection with the pinion shaft.

In use the seed is placed in the seed-box on the upper surface of the seed-distributing wheel, and the forward movement of the machine will cause the seed-distributing wheel to rotate, which movement will cause the seed to settle into the seed-receptacles, and in its rotation will be carried under the free end of the cut-off to limit the seed to that contained in the seed-cells, which in the onward movement of the seed-distributing wheel will be discharged through the outlet-opening and descend through the seed-spout into the furrow formed by the shovel on its front side.

In operating the machine, if from any cause a seed should be lodged between the free end of the cut-off and the seed-distributing wheel, the grooves formed in its upper face will in the rotary movement of the wheel engage such grain or grains and dislodge them and carry them through the channel formed under the lever cut-off.

For the purpose of varying the distance between the deposits of seed or the quantity of seed deposited, seed-distributing wheels containing a greater or less number of seed-cells and wheels having seed-cells of greater or less capacity are employed to adapt the machine to plant various kinds or varieties of seeds.

I claim as my invention—

1. The combination, in a seed-distributing wheel, of peripheral seed-openings and an annular groove within the seed-openings on its upper face, substantially as and for the purpose set forth.

2. The combination, in a seed-distributing wheel, of peripheral seed-openings, an annular groove within the seed-openings on its upper face, and grooves in its upper face extending from the annular groove to the periphery of the wheel, substantially as and for the purpose set forth.

3. The combination of a recessed bottom to the seed-box and a seed-distributing wheel to rotate centrally within the recess of the seed-box bottom, said seed-distributing wheel having peripheral openings, which, in connection with the annular wall of the recess, form seed-cells, substantially as and for the purpose set forth.

4. The combination of a recessed bottom to the seed-box, having a seed-outlet opening extending beyond the inner face of the annular wall of the recess, and a seed-distributing wheel located centrally within the opening in the bottom and having peripheral openings, which, in connection with the annular wall of the recess, form seed-cells, said peripheral openings, in connection with seed-outlet opening, forming an enlargement of the seed-cells, substantially as and for the purpose set forth.

5. The combination of a seed-distributing wheel with axial opening and an overspanning axial support to the seed-distributing wheel, said overspanning support provided with a depending stud-journal to enter the axial opening in the seed-distributing wheel, substantially as and for the purpose set forth.

6. The combination of a seed-distributing wheel, a lever cut-off, and a bar-spring to the lever cut-off, substantially as and for the purpose set forth.

7. The combination of a recessed bottom to the seed-box, a seed-distributing wheel with peripheral opening to rotate in the recess of the seed-box bottom, an overspanning axial support to the seed-distributing wheel, and a spring-actuated cut-off to the seed-cells, substantially as and for the purpose set forth.

8. The combination of a shaft-support to the gear-pinion capable of an endwise movement, a gear-pinion fixed on the endwise-moving shaft, a shifting-bar with yoke-arms embracing the shaft on each end of the pinion, and detents projecting from the shaft portion of the shifting-bar to hold the pinion in or out of gear mesh with the gear-wheel of the seed-distributing wheel, substantially as and for the purpose set forth.

JAMES HERVA JONES.

Witnesses:
H. D. EASTMAN,
A. O. BEHEL.